Dec. 10, 1968   A. J. STAEMPFLI   3,415,061
SEA WALL STRUCTURE
Filed Aug. 24, 1966   2 Sheets-Sheet 2

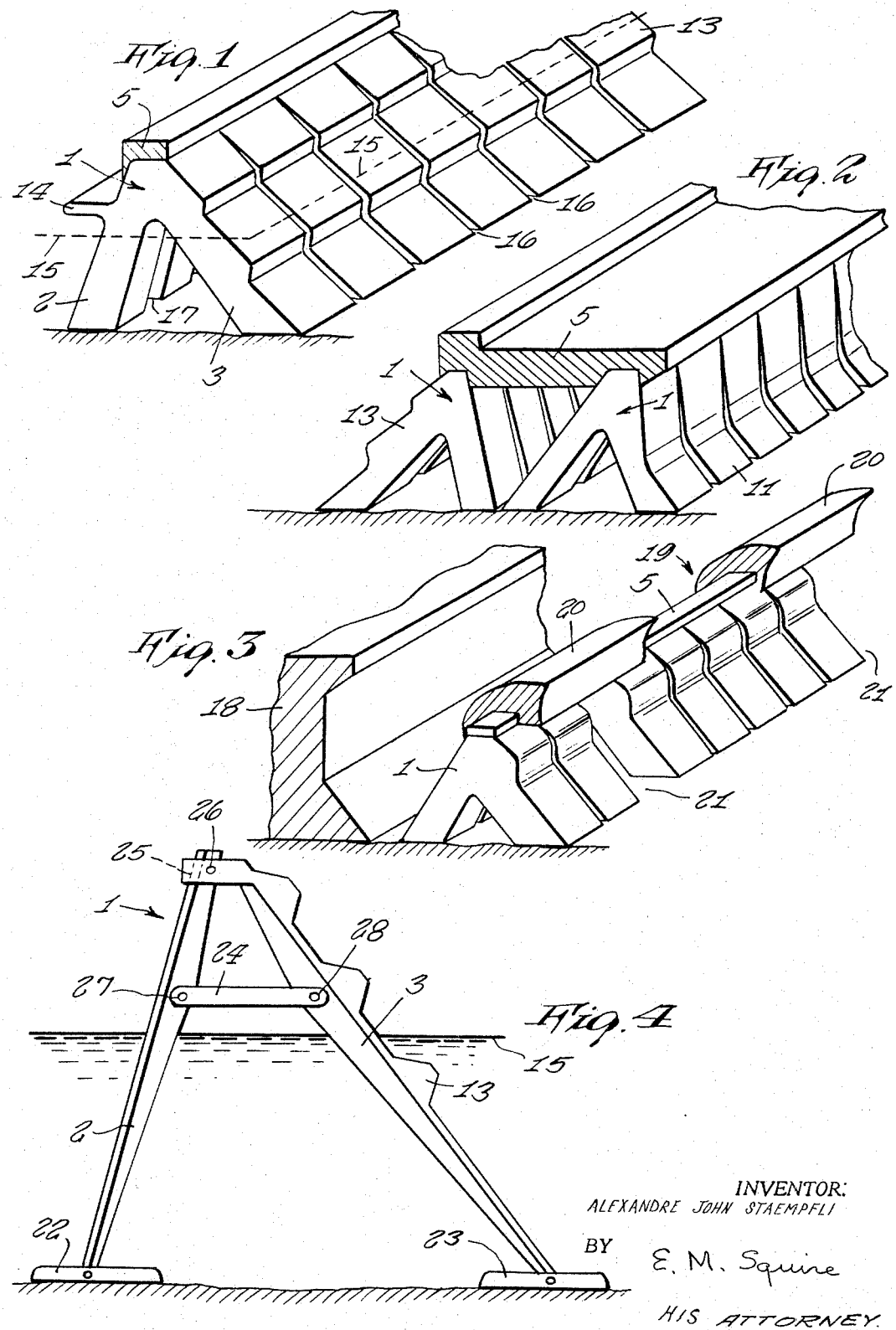

INVENTOR:
ALEXANDRE JOHN STAEMPFLI
BY   E. M. Squire
HIS ATTORNEY

United States Patent Office 3,415,061
Patented Dec. 10, 1968

3,415,061
SEA WALL STRUCTURE
Alexandre John Staempfli, Mies, Waadt, Switzerland
Continuation-in-part of application Ser. No. 136,551,
Sept. 7, 1961. This application Aug. 24, 1966, Ser.
No. 574,588
6 Claims. (Cl. 61—4)

ABSTRACT OF THE DISCLOSURE

A sea wall type structure formed of a series of individual inverted V-shaped structural elements the lower ends of which are supported by an underwater ground surface. The convergent upper end portions of the elements are located above the water and are interconnected by a continuous superstructure. The forward legs are directed toward the open sea and the rearward legs are directed toward the sheltered water. Each series of legs is spaced to define a series of turbulence producing upwardly convergent outer slots and similarly upwardly convergent turbulence producing inner slots for dissipating the energy in the water flowing therethrough. Wave breaking projections are optionally provided on the forward legs, or the entire structure may serve as a wave breaking protector for a conventional structure. In the latter case, the superstructure operates as a wave breaking device.

This application is a continuation-in-part of my application Ser. No. 136,551 filed on Sept. 7, 1961, now abandoned.

The present invention relates to partially submerged structures such as piers, moles, breakwaters, sea walls and the like.

Generally, the invention comprises a sea wall type structure having an outer side which faces the open sea and an inner side which faces water sheltered by the structure. The structure is composed of a series of laterally aligned generally inverted V-shaped elements each having an outer leg the outer surface of which faces toward the open sea and an inner leg the inner surface of which faces the sheltered water. The lower ends of the elements rest upon and are supported by an underwater ground surface. The convergent upper end portions of the elements are located above the level of the water. The leg portions or adjacent elements below the upper end portions are laterally spaced to define an inner series and an outer series of energy dissipating slots each of which extends continuously above and below the surface of the water.

In a modified form of the invention the leg portions are provided with lateral projections which at least partially close the energy dissipating slots at their lower ends and also at the water level.

A continuous superstructure extends along the tops of the convergent upper end portions and interconnects the upper end portions to form a unitary sea wall type structure.

The elements are formed of pre-cast concrete and are installed in side-by-side relationship to form the sea wall type structure. The superstructure is molded in situ by pouring suitably reinforced concrete over the upper end portions of the elements. This feature has the advantage of providing a decreased cost since the individual elements may be mass produced using a few molds. Moreover, the amount of concrete is reduced as compared with a solid sea wall.

At least one wave-breaking projection is ordinarily formed on the outer surface of the outer leg facing the open water. Additionally, where the structure operates as a sea wall rather than as a pier or roadway, the superstructure is shaped to define a further wave breaking projection.

The invention will be better understood upon reading the following specification with reference to the accompanying drawing forming a part hereof.

Figure 5:
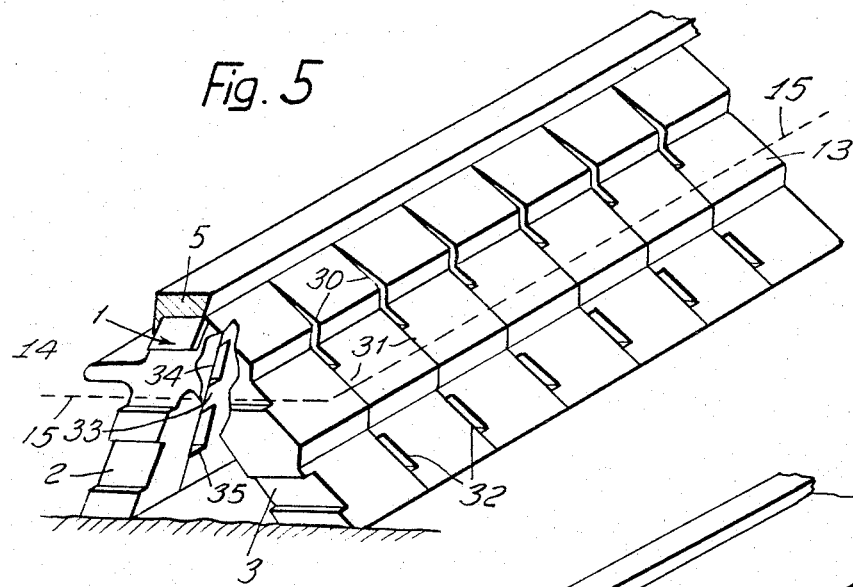
Figure 6:
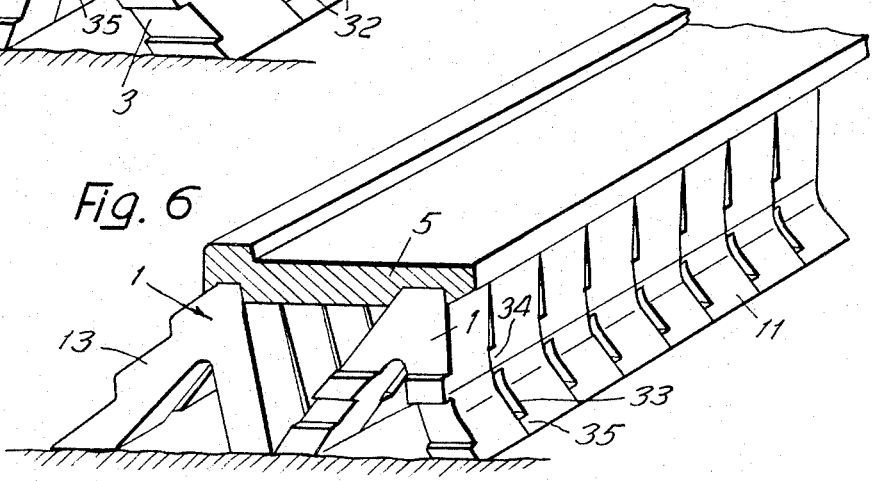
Figure 7:
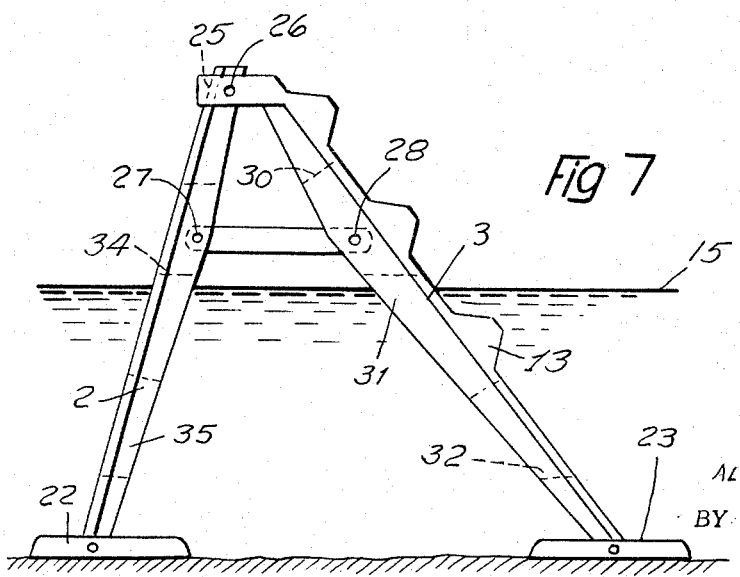

Referring to the drawing:
FIGURE 1 is a fragmentary perspective view of a sea wall embodying the invention.
FIGURE 2 is a fragmentary perspective view of a double sea wall supporting a roadway.
FIGURE 3 is a fragmentary perspective view showing a conventional pier protected by a wave-breaking sea wall in accordance with the invention, the view being partly broken away to illustrate details of construction.
FIGURE 4 is a side elevational view of a single composite structural element which, when included in a series of similar elements placed side-by-side, will form an element of a sea wall, pier or the like.
FIGURE 5 is a view similar to FIG. 1 wherein portions of the slots defined between adjacent elements are obstructed.
FIGURE 6 is a view similar to FIG. 2, wherein the slots are obstructed as in FIG. 5.
FIGURE 7 is a view similar to FIG. 4, additionally including slot obstructing means.

Referring to FIG. 1, a sea wall or mole is formed by a single row of prefabricated concrete elements 1. Each of the elements 1 comprises an inner leg portion 2 which faces the sheltered water and an outer leg portion 3 which faces the open water. The unitary upper end portions of the elements 1 are interconnected by a continuous reinforced concrete superstructure 5 which unites the elements 1 into an effectively integral or one piece assembly. The outer leg portions 3 of the elements 1 have wave-breaking projections or serrations 13 formed thereon for breaking oncoming waves arriving from the open sea. The inner leg portions 2 of the elements 1 are provided with horizontally extending shelf-forming projections 14 providing a gangway or quay for docking boats and for sheltering them in the port or harbor defined by the sea wall. The normal level of the sea or lake water is indicated at 15.

The narrow gaps 16 between adjacent ones of the outer legs 3 and the somewhat wider gaps 17 between adjacent ones of the inner legs 2 provide flow passages for the backwash of the waves which permit a restricted flow of water successively back and forth between the external unsheltered zone and the internal sheltered zone. The outer series of slots 16 and the inner series of slots 17 produce energy dissipating turbulence in the water flowing therethrough.

In FIG. 2, the elements 1 are arranged in two parallel rows with each element 1 of the inner series aligned with an element 1 of the front or outer series. The outer legs 3 of the elements 1 of the front or outer row have wave-breaking projections 13 formed thereon as described above in connection with FIG. 1. A continuous superstructure 5 extends along the tops of both rows of elements 1 and interconnects them to provide a unitary structure as in FIG. 1. The superstructure 5 of FIG. 2 is wider than that of FIG. 1 and provides a roadway or dock area.

In FIGS. 1 and 2, the inner leg portions 2 and outer leg portions 3 of adjacent elements 1 taper convergently downwardly in width with the direction of alignment of the elements. As a result, the slots 16 and 17 taper convergently upwardly and are closed where the top portions of the elements 1 abut and are interconnected by the continuous superstructure 5 or 14.

In FIG. 3, there is shown a previously existing main sea wall 18 of conventional construction, such as masonry, reinforced concrete or the like. The main sea wall 18 is protected by a subsequently erected breakwater 19 constructed in accordance with the invention. The breakwater 19 comprises a series of elements 1 interconnected by a continuous superstructure 5. The superstructure 5 supports a wave-breaking member 20 the front of which is curved concavely toward the arriving waves. The member 20 may be interrupted at intervals, if desired. Only the member 20 protrudes above the water level for breaking waves before they reach the main sea wall 18. The elements 1 of FIG. 3 are shown arranged in groups so that relatively wide flow passages 21 are provided between the end elements of adjacent groups. Water which has passed over the wave-breaking member 20 may flow more freely back to the unsheltered side of the breakwater 19 through the wide passages 21 than through the relatively narrow passages between adjacent elements.

Referring to FIG. 4, there is shown a composite element which is an assembly of prefabricated reinforced concrete members, the various component members being assembled and erected in situ. The composite element comprises a pair of inner and outer legs 2 and 3, respectively. The lower ends of the legs 2 and 3 are pivoted to feet 22 and 23, respectively. The feet 22 and 23 rest on the bottom of a body of water the normal level of which is indicated at 15. Wave-breaking projections 13 are formed on the outer side of the outer leg 3, as previously described. A yoke 25 integrally formed on the upper end portion of the outer leg 3 embraces the upper end portion of the inner leg 2 and is secured thereto by a pin 26 forming a pivotal connection between the upper end portions of the inner and outer legs 2 and 3, respectively.

The legs 2 and 3 are of T-shaped cross-sectional configuration with the relatively narrow central legs of the two T's directed toward each other and the cross portions facing the open water and the sheltered water, respectively. The portions of the legs 2 and 3 which are directed toward each other are interconnected by a crossmember or brace 24. One end of brace 24 is secured to the inner leg 2 by a pin 27 and the other end is secured to the outer leg 3 by a pin 28.

The feet 22 and 23 may conveniently be positioned on the underwater supporting surface with their legs 2 and 3, respectively, attached thereto. The two legs may then be connected together by means of the brace 24 and the pins 26, 27 and 28.

Referring to FIG. 5, the arrangement is similar to that described above in connection with FIG. 1. In FIG. 5, each of the outer legs 3 is provided with leftwardly extending projections 31 which obstruct the slot shown in FIG. 1 to form two separate aligned slots 30 and 32. In like manner, the inner leg 2 is provided with leftwardly extending projections 33 which form separate aligned slots 34 and 35. The slots 32 and 35 are located below the water level 15 but do not extend downwardly as far as the underwater supporting surface. The slots 30 and 34 are located above the water level 15.

In FIG. 5, the arrangement is similar to FIG. 2, except that leftwardly extending projections 34 and 35 provide separate aligned slots 33 above and below the water level.

FIG. 7 is similar to FIG. 4. Projections 31, which are directed away from the observer in FIG. 7, define separate aligned slots 30 and 32 when placed next to a similar unit. The slots 30 and 32 are above and below the water level 15, respectively.

While I have shown and described what I believe to be the best embodiment of my invention, it will be apparent to those skilled in the art that various changes and modifications may be made therein without departing from the spirit and scope of the invention as defined in the appended claims.

What is claimed is:

1. A sea wall type structure having an outer side which faces the open sea and an inner side which faces water sheltered by said structure, said structure comprising: a series of laterally aligned generally inverted V-shaped structural elements each comprising an outer leg portion, the outer surface of which faces toward said open sea and an inner leg portion, the inner surface of which faces said sheltered water, the lower ends of said elements resting upon and being supported by an underwater ground surface, the convergent upper end portions of said elements being located above the level of said water, said leg portions of adjacent elements below said upper end portions being spaced laterally to define an inner series and an outer series of slots each extending above and below the surface of said water and through which water may flow successively back and forth between said open sea and said sheltered water, said slots in each series producing energy dissipating turbulence in the water flowing therethrough; and a continuous superstructure extending along the tops of said convergent upper end portions and interconnecting said upper end portions to form a unitary structure, said outer and inner leg portions tapering convergently downwardly in the direction of lateral alignment of said elements, said slots tapering convergently upwardly and being closed where said superstructure extends along said convergent upper end portions of said elements.

2. A structure according to claim 1, further comprising at least one wave breaking projection formed on said outer surface of said outer leg portion of a plurality of the elements of said series, said wave-breaking projections being positioned to produce energy dissipating turbulence in waves arriving from the open sea and impinging against said outer leg portions.

3. A structure according to claim 2, wherein said superstructure is shaped to define a further wave-breaking projection extending continuously along the outer sides of said upper end portions of said elements above the level of said water.

4. A structure according to claim 1, wherein said superstructure is shaped to define a wave-breaking projection which extends continuously along the outer sides of said upper end portions of said elements above the level of said water.

5. A structure according to claim 1, wherein said slots extend continuously above and below said surface of said water.

6. A structure according to claim 1, further comprising means carried by said leg portions of said elements and defining a series of separate aligned slots located, respectively, above and below said surface of said water.

References Cited

UNITED STATES PATENTS

| 315,384 | 4/1885 | Boynton | 61—4 |
| 954,283 | 5/1910 | Hawkes | 61—4 |
| 1,847,043 | 2/1932 | Ball | 61—4 |
| 1,812,300 | 6/1931 | Leeds et al. | 61—4 |
| 2,827,769 | 3/1958 | Hunter | 61—4 |

FOREIGN PATENTS

| 537,560 | 6/1941 | Great Britain. |
| 337,796 | 5/1959 | Switzerland. |
| 1,215,413 | 11/1959 | France. |

EARL J. WITMER, *Primary Examiner.*